United States Patent [19]
Kakuta et al.

[11] Patent Number: 6,072,487
[45] Date of Patent: *Jun. 6, 2000

[54] SCROLL SYNCHRONIZING SYSTEM METHOD AND COMPUTER MEMORY PRODUCT

[75] Inventors: Jun Kakuta; Akihiko Obata, both of Kawasaki, Japan

[73] Assignee: Fujitsu Limited, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/713,534

[22] Filed: Sep. 13, 1996

[30] Foreign Application Priority Data

Mar. 19, 1996 [JP] Japan ................................. 8-063273

[51] Int. Cl.⁷ ....................................................... G06F 3/14

[52] U.S. Cl. ........................................... 345/341; 345/123

[58] Field of Search ..................................... 345/341, 340, 345/342, 339, 326, 973, 121, 123, 124, 125

[56] References Cited

U.S. PATENT DOCUMENTS

| | | | |
|---|---|---|---|
| 4,714,918 | 12/1987 | Barker et al. | 345/118 |
| 4,922,238 | 5/1990 | Aoki et al. | 345/123 |
| 5,196,838 | 3/1993 | Meier et al. | 345/118 |
| 5,491,780 | 2/1996 | Fyles et al. | 345/332 |
| 5,611,060 | 3/1997 | Belfiore et al. | 345/341 |
| 5,659,333 | 8/1997 | Okishima | 345/123 |

*Primary Examiner*—Crescelle N. dela Torre
*Attorney, Agent, or Firm*—Staas & Halsey

[57] ABSTRACT

The scroll synchronizing system has a moving amount acquiring unit for acquiring a screen area to be moved and its moving amount, when the screen of an application program moves, a drawing information control unit for controlling the information of the drawing object, and an application executing unit for judging the drawing object to be moved according to the information acquired by the moving amount acquiring unit, sequentially updating the information in the drawing information control unit of the drawing object to be moved, and redrawing the drawing object to be moved. The drawing object drawn on the general application program is synchronized with the change of the screen of the general application program.

12 Claims, 9 Drawing Sheets

FIG. 2
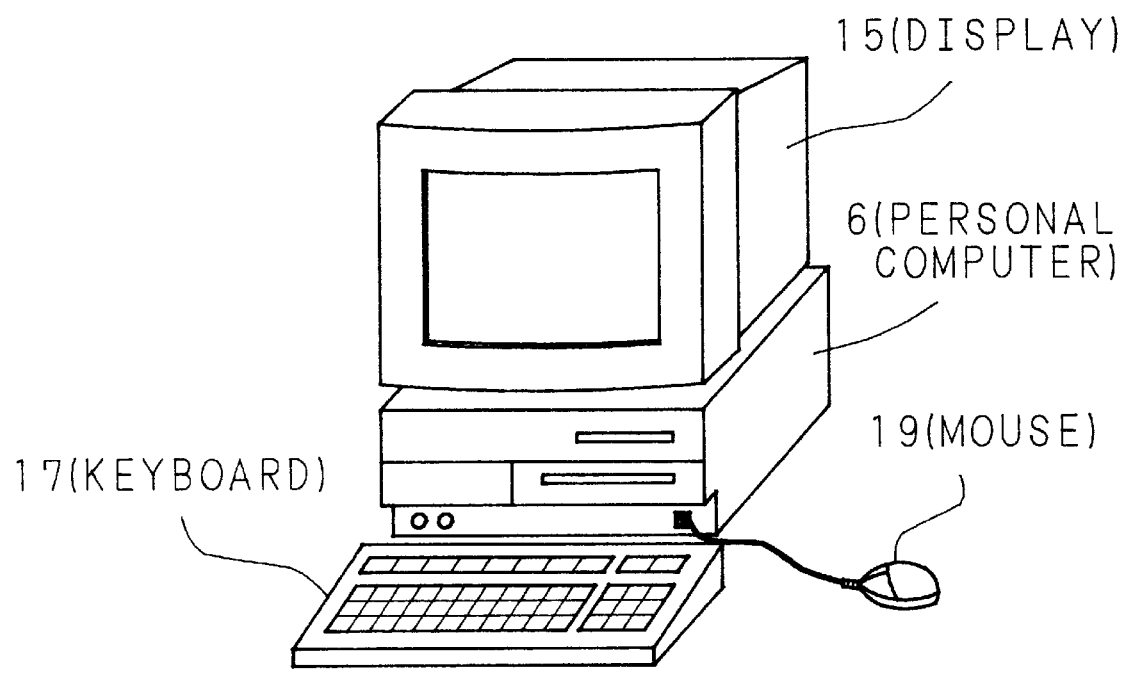
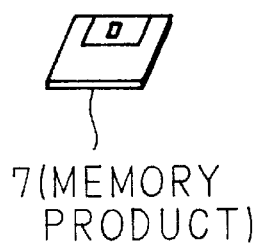

SCROLL SYNCHRONIZING SYSTEM METHOD AND COMPUTER MEMORY PRODUCT

BACKGROUND OF THE INVENTION

Field of the Invention

The present invention relates to a scroll synchronizing system used in an application program for drawing a picture by an input device on a window of the general application program, capable of synchronizing a drawn information with a screen change of the general application program on scrolling.

Description of the Related Art

A drawing system for handwriting on a window of the general application program such as word processor and spreadsheet by using pointing device such as mouse and pen tablet or input device such as touch panel has been already developed. Using this system, handwriting drawing or user comment can be recorded on the window of the general application program, and it is utilized as electronic blackboard for geographically distributed meeting and face-to-face meeting.

Such handwritten drawing and user comment, once displayed, are not synchronized with the screen changes of the general application program. Therefore, even if a handwritten comment is inputted for a certain sentence, when the screen is scrolled, or the original position of the referred sentence is moved, the handwritten comment is not displayed in the proper position. In the conventional system, when gone away from the screen by scroll, the handwritten information is not reproduced at all. Thus, hitherto, the information handwritten on the general application program is handled only as temporary data, not satisfying the request of the user to show the handwritten information again in the proper position after changing the screen by editing operation such as scroll of screen of general application program or input of sentence.

SUMMARY OF THE INVENTION

It is hence a primary object of the invention to present a scroll synchronizing system of a drawing apparatus capable of synchronizing a drawing information with a screen change of a to general application program, when screen change such as scroll occurs in the general application program, thereby scrolling the handwritten drawing and comment to a proper position.

The scroll synchronizing system of the invention has a moving amount acquiring unit for acquiring the screen area to be moved and its moving amount when the screen of an application program is moved, a drawing information control unit for controlling the information of the drawing object, and an application executing unit for judging the drawing object to be moved according to the information acquired by the moving amount acquiring unit, sequentially updating the information in the drawing information control unit of the drawing object to be moved, and redrawing the drawing object to be moved.

In the scroll synchronizing system of the invention, when the screen of the general application program is changed, the drawing object drawn on the general application program is synchronized with its change. For example, the handwritten drawing is changed in synchronism with the screen change of the general application program by editing operation such as screen scroll and sentence input. After scroll or document editing of general application program, the drawing is reproduced at a correct position.

The above and further objects and features of the invention will more fully be apparent from the following detailed description with accompanying drawings:

BRIEF DESCRIPTION OF THE DRAWINGS

FIG. 2 is a schematic diagram showing a constitution of an embodiment of the invention;

DESCRIPTION OF THE PREFERRED EMBODIMENTS

Figure 1:
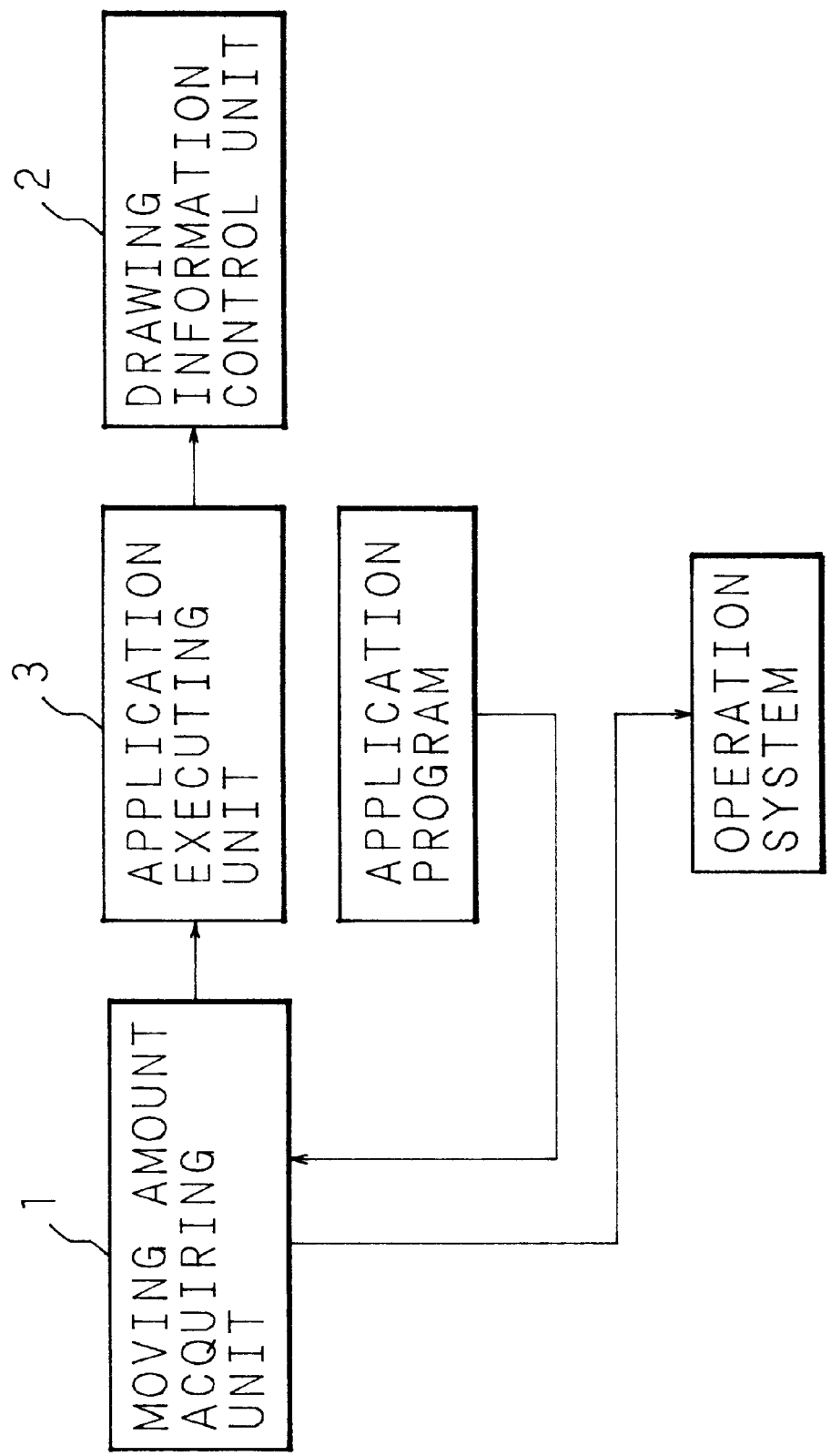
FIG. 1 is a block diagram showing a basic constituent example of the invention.

Referring now to the drawings, embodiments of the invention are described in detail as follows.

FIG. 1 is a block diagram of a system of the invention. This system has a moving amount acquiring unit 1 for acquiring the screen area to be moved and its moving amount when the screen of a general application program is moved by scroll or sentence input, a drawing information control unit 2 for controlling the information such as the position in which the drawing object is displayed, and an application executing unit 3 for judging the drawing object to be moved according to the notification from the moving amount acquiring unit 1, starting up the moving amount acquiring unit 1, sequentially updating the information in the drawing information control unit 2, and redrawing the appropriate drawing object.

In a first embodiment of the invention, if any change such as scroll and sentence input occurs in the general application program in which handwritten comment and drawing are written, the moving amount acquiring unit 1 acquires the moving area and moving amount of the window in the general application program. The moving amount acquiring unit 1, only when change in the window of the application program is confirmed, notifies the application executing unit 3 of the acquired moving area and moving amount. According to the notified information, the application executing unit 3 searches the drawing object to be synchronized and moved in the drawing information control unit 2, and, if necessary, updates the information of the drawing object in the application executing unit 3, and redraws the information. In this way, the drawing object is displayed in synchronism with the screen changes of the general application program.

In a second embodiment of the invention, when user input such as sentence input and scroll occurs in the general application program in which handwritten comment and drawing are written, the general application program issues a drawing command to the operation system, but this drawing command is hooked by the moving amount acquiring unit 1 before arriving at the operation system. The moving amount acquiring unit 1 inspects whether its hooked command has been issued by the application program or not, and if found to be issued by the application program as a result of inspection, the screen drawing area is notified the application executing unit 3. The application executing unit 3 inspects the drawing object table of the drawing information control unit 2 from the notified information, and inspects whether there is a drawing object to be moved or not. If there is a drawing object to be moved, the application executing unit 3 calculates the moving amount from the notified information, and changes the value of the offset field of the drawing object in the table by the portion of the moving amount, and redraws the drawing object. In this way, the drawing object is displayed in synchronism with the screen changes of the general application program.

In a third embodiment, when a screen scroll occurs in the general application program in which handwritten comment and drawing are written, the general application program issues a screen scroll command to the operation system, but this screen scroll command is hooked by the moving amount acquiring unit 1 before arriving at the operation system. The moving amount acquiring unit 1 inspects whether the hooked scroll command has been issued by the application program or not, and if found to be issued by the application program as a result of inspection, the scroll area and the scroll amount are notified the application executing unit 3. The application executing unit 3 inspects the drawing object table of the drawing information control unit 2 from the notified information, and inspects whether there is a drawing object to be moved or not. If there is a drawing object to be moved, the application executing unit 3 changes the value of the offset field of the drawing object in the table by the portion of the scroll amount, and redraws the drawing object. In this way, the drawing object is displayed in synchronism with the screen changes of the general application program.

FIG. 2 is a schematic diagram showing an embodiment of the system of the invention. This system has a personal computer 6, a display 15 for displaying the drawing object, and a keyboard 17 for key input and a mouse 19 for instruction and operation connected to the personal computer 6. The personal computer 6 loads the program for executing various processes mentioned later, from a memory product 9 such as magnetic disk in which the program is recorded.

Figure 3:
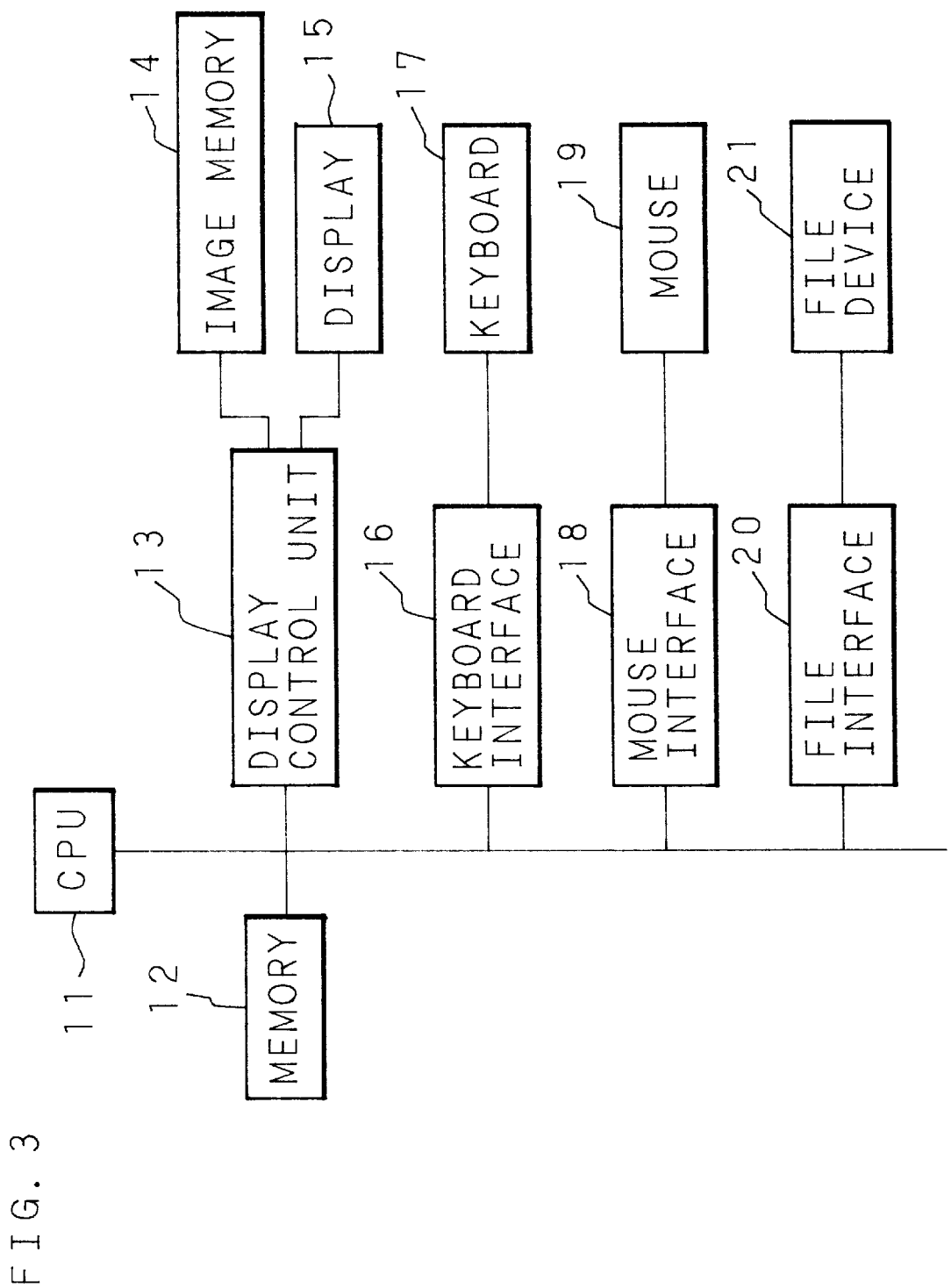
FIG. 3 is a block diagram showing a constitution of an embodiment of the invention.

FIG. 3 is a block diagram showing a system constituent example of the invention. A system bus 22 is connected with a CPU 11, a memory 12, an image memory 14 and a display 15 through a display control unit 13, a keyboard 17 through a keyboard interface 16, a mouse 19 through a mouse interface 18, and a file device 21 through a file interface 20.

The memory 12 stores the general application program, configurations of the personal computer 6 and others. The display control unit 13 controls writing and reading of image information in the image memory 14, and also controls the image memory 14 and display 15 so that the image information in the image memory 14 may be shown in the display 15. The display 15 is composed of CRT, liquid crystal panel, plasma display, etc.

The key input information from the keyboard 17 and the pointing information from the mouse 19 are supplied into the system bus 22 through the keyboard interface 16 and mouse interface 18. Instead of the mouse interface 18 and mouse 19, a tablet interface and an electronic stylus pen may be used. The file device 21 is composed of floppy disk, magnetic disk, optomagnetic disk, etc., which stores a file created in the personal computer 6 or a file received from an ISDN circuit (not shown).

Figure 4:
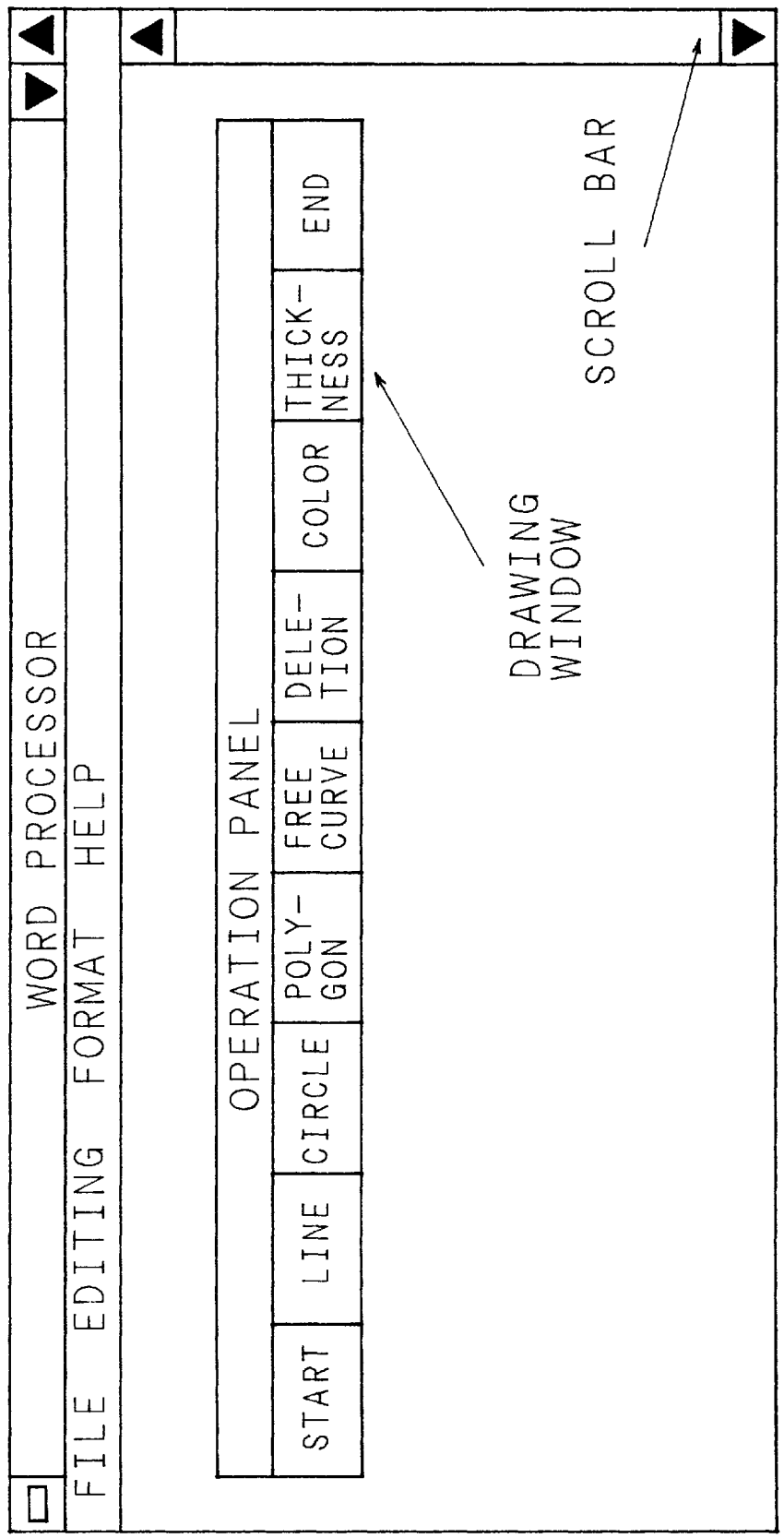
FIG. 4 is a schematic diagram showing an initial screen when creating a drawing object.

The operation is described as follows. First, the operation for drawing the handwritten information is described. FIG. 4 shows an initial screen for starting input of drawing or handwritten ideas. When the target general application program for handwritten drawing is started up, operation panels as shown in FIG. 4 are displayed on the screen. By clicking the operation button, each function can be utilized.

The buttons on this operation panel are described. From the left, there are buttons for start, line, circle, polygon, free curve, deletion, color, thickness, and end. The operation panel may possess various other function buttons. When the document window for drawing is selected, other buttons except start and end are disabled, and these functions cannot be selected. When the start button is clicked, the window for drawing can be selected. The drawing is made only on that window selected by mouse or other pointing device. When the window for drawing is selected, the start button is disabled, and other buttons are enabled.

Figure 5:
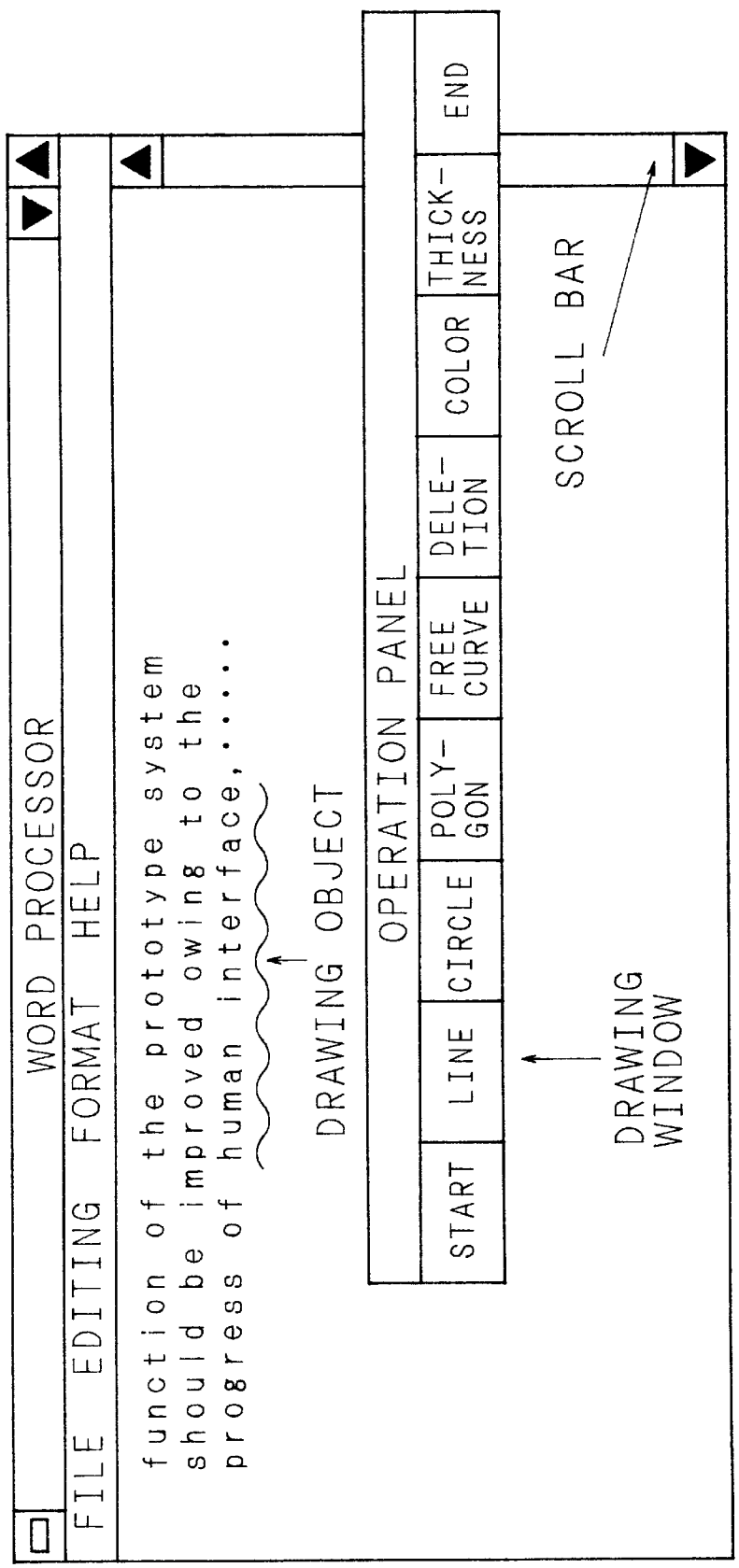
FIG. 5 is a schematic diagram showing an intermediate screen when creating a drawing object.

When the button of line, circle, polygon or free curve is clicked by the mouse and moving the mouse, drawing can be executed. When a drawing object is selected and the deletion button is clicked by the mouse, the object can be deleted. By clicking the color button by the mouse, the color of the drawing object can be selected from preset color table, and the selected color is applied in the subsequent drawing. When the thickness button is clicked by the mouse, the thickness of a line can be selected from preset pen thickness table, and the selected thickness is applied in the subsequent drawing. As shown in FIG. 5, when the free curve tool is selected from the operation panel, a free curve can be drawn by the mouse or other means. Along with the tracing of the mouse, a free curve (a drawing object composed of wave line in FIG. 5) is drawn on the window of the target application program.

Figure 6:
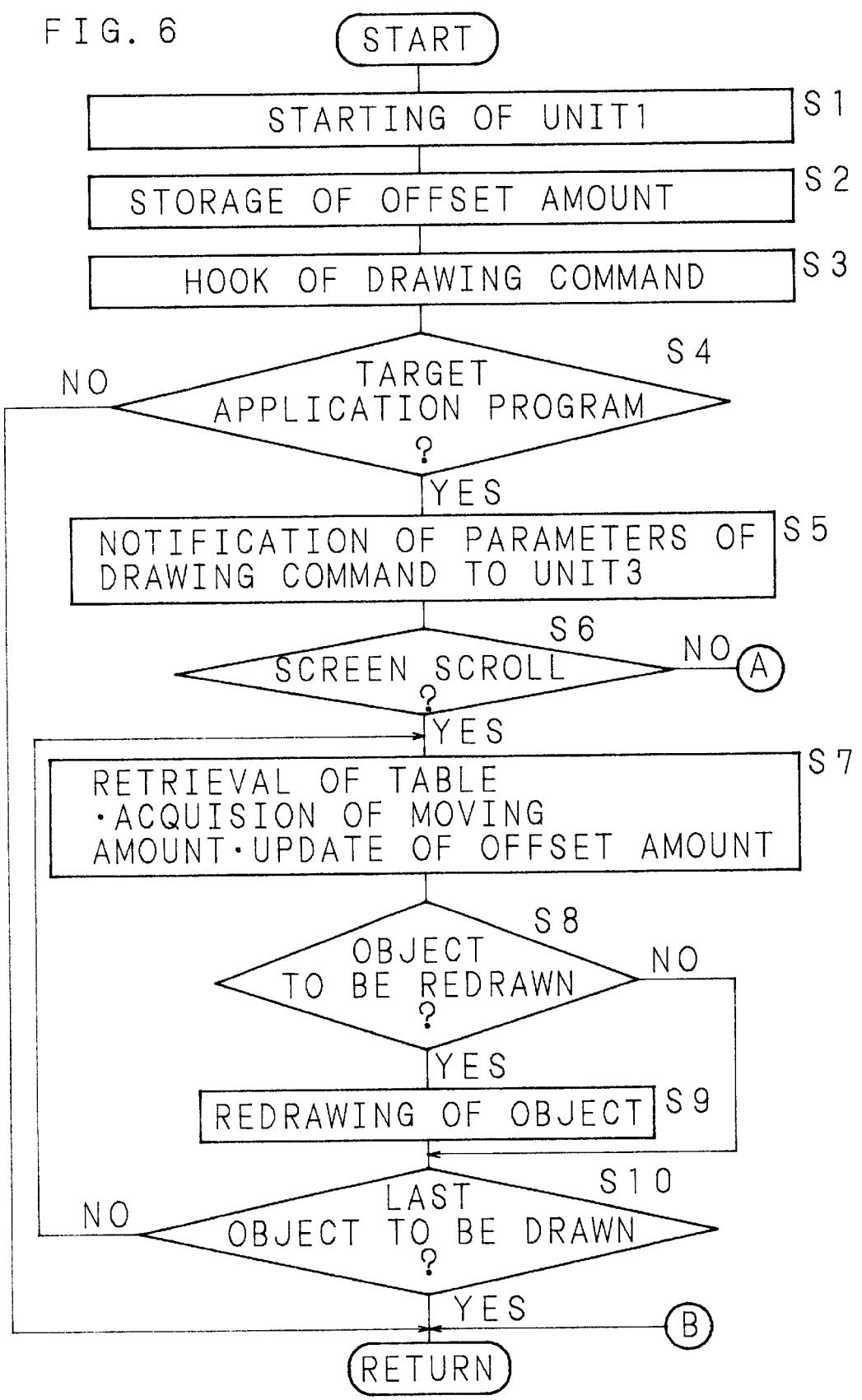
FIG. 6 is a flowchart showing a procedure of the invention.
Figure 7:
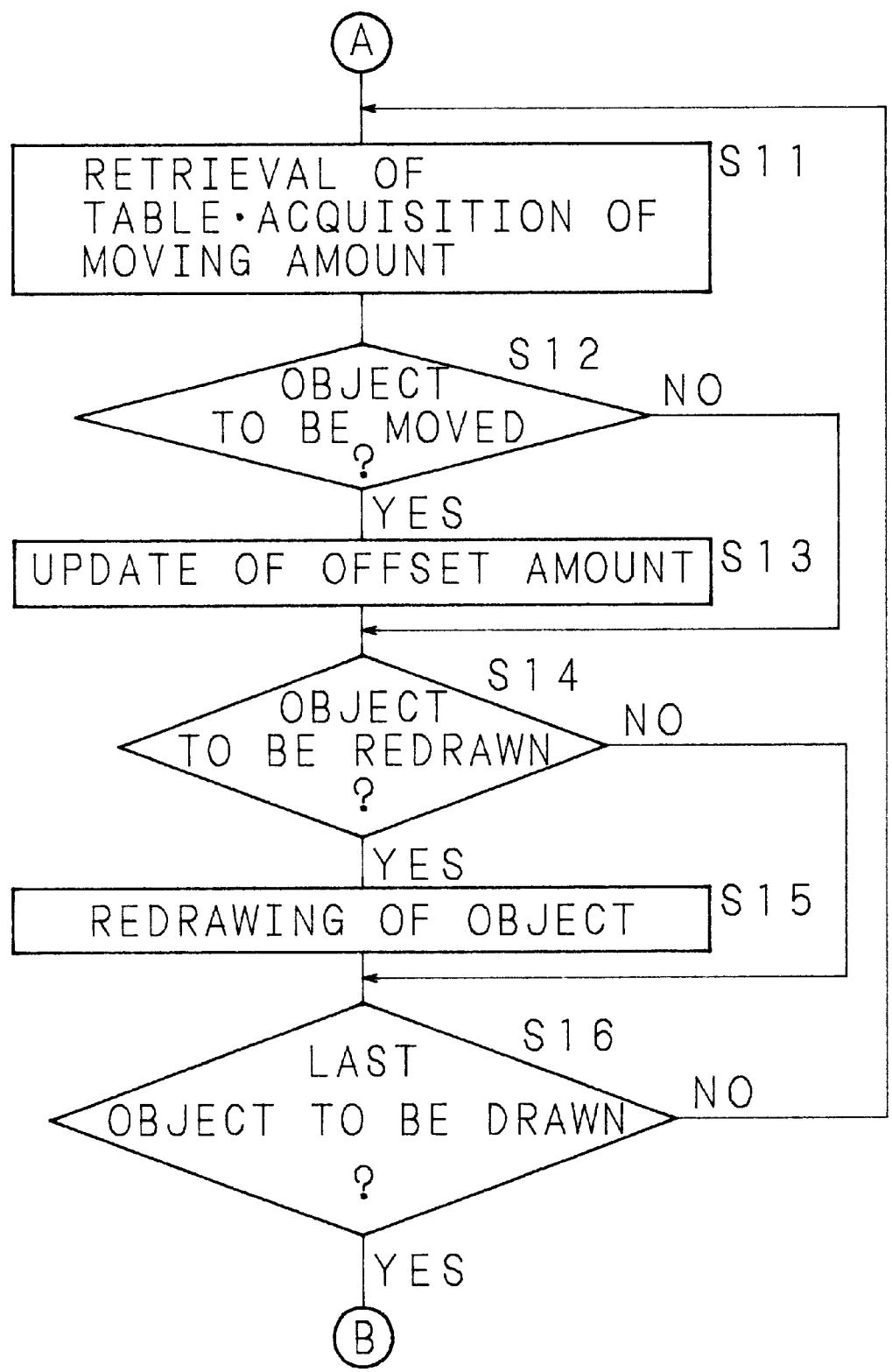
FIG. 7 is a flowchart showing a procedure of the invention.

Next, as a feature of the invention, the synchronizing operation of the drawing object to cope with the screen change of the general application program is described. FIG. 6 and FIG. 7 are flowcharts showing its operating procedure.

When the start button is clicked and the window of a general application program for drawing is selected, the moving amount acquiring unit 1 is started up to hook the drawing command issued by the general application program to the operation system (step S1). While creating a drawing object by using the mouse 19, information for composing drawing object such as the circumscribing area of the drawing object and position thereof, and the offset amount from the initial state of the client area in the created state of drawing object are stored in the drawing object table of the drawing information control unit 2 (step S2). This offset amount is described later.

When scroll or sentence input from keyboard 17 occurs in the general application program, a drawing command for updating the screen is issued to the operation system by the general application program. This drawing command is hooked by the moving amount acquiring unit 1 (step S3). The moving amount acquiring unit 1 judges whether the drawing command has been issued by the target application program or not (step S4). If found to be issued by the target application program, the parameter of the hooked drawing command is notified the application executing unit 3 (step S5). If it is not the command issued by this target application program, the parameter is not notified the application executing unit 3, and the control is returned to the operation system.

The application executing unit 3 judges whether the screen change in the general application program is screen scroll or not according to the notified parameter (step S6). The generated screen change in the general application program includes two types of scroll, which are scroll of entire screen and a partial scroll for one or plural lines of sentence input in the document by word input in a certain portion of a document. In the case of scroll of entire screen, the screen drawing area of the drawing command is the entire client area of the window for drawing, but in the case of partial scroll below a certain line, the screen drawing area is always smaller than the client area of the document window. Therefore, it is possible to judge whether the entire screen scroll or partial scroll above or beneath a certain line, from the parameter of the notified command.

First, in the case of entire screen scroll, the method for realizing synchronization of drawing object is described. The drawing object is drawn in the area of client coordinates, having the origin located in the upper left corner of the window called the client area in the drawing object window in a certain state. Therefore, when scroll occurs in the general application program, it is drawn always in the same position if the drawing object is drawn in the client coordinates. Accordingly, on the basis of start-up time of the general application program, if scroll occurs thereafter, the offset amount from this reference point is increased or decreased, and the coordinates of the origin in the client coordinates is shifted up or down by this offset amount to be drawn, so that synchronization of scroll is realized.

Figure 8B:
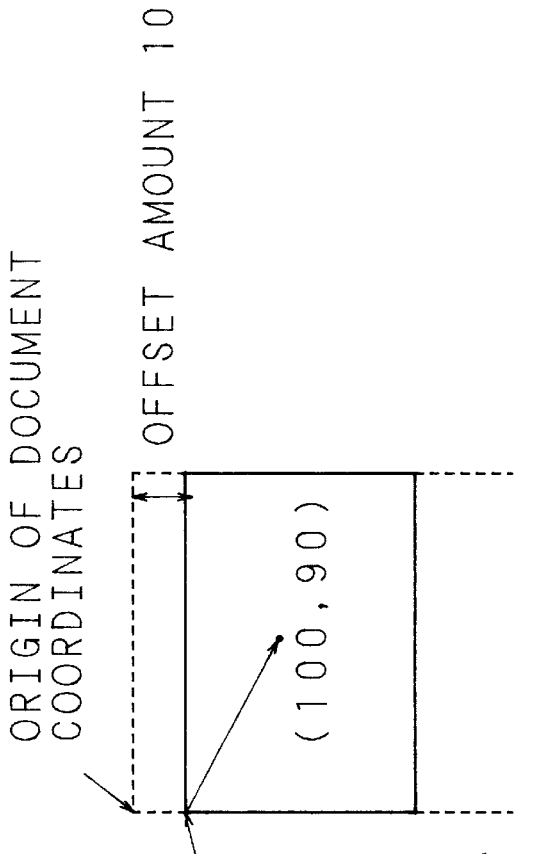
FIGS. 8A, 8B are schematic diagrams for explaining an offset amount in the invention.
Figure 8A:
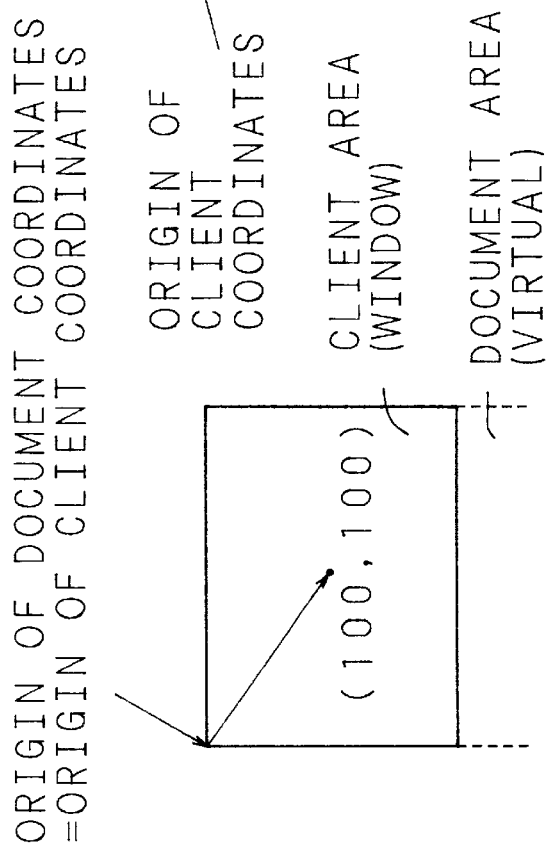

The offset amount is used in the meaning of "difference between origin of document coordinates and origin of client coordinates" as the data to be stored by the drawing object. Since scroll is not done right after starting up the application, the origin of document coordinates is equal to that of client coordinates (see FIG. 8A). Herein, if scrolled down by 10, the drawn pattern is moved up by 10. At this time, in the present client coordinates, it is drawn at (100, 90), but by using the concept of offset amount, it is not necessary to change the coordinates in document coordinates (see FIG. 8B). For example, data of drawing object (offset amount, X-coordinate, Y-coordinate) are changed by scroll from (0, 100, 100) to (10,100, 100).

Generally, drawing is done in the client coordinates, since each drawing object holds the offset amount, by shifting the origin of coordinates by the portion of this offset amount when drawing, the drawing object is moved appropriately. When the entire screen is scrolled, after updating the offset amounts of all drawing objects, necessary drawing objects are redrawn. In every scroll, the offset amounts of all drawing objects are changed by the portion of the scroll amount (or drawing moving amount) from the present value. Since the offset amount from the start-up time is always maintained, and the area for redrawing can be converted into the document coordinates.

The application executing unit 3 retrieves the object for redrawing in the following manner, and redraws appropriate objects. First, using the notified parameter and the offset amount, the area of drawing object to be moved in the document coordinates is determined, and the moving amount of the drawing object is also determined from the notified parameter, thereby increasing or decreasing the offset amount. Moreover, from the circumscribed area of the drawing object and the offset amount of the drawing object modified by the moving amount which are stored in the drawing object table of the drawing information control unit 2, a new circumscribed area of the drawing object is determined in the document coordinates (step S7).

Depending on the judgement whether this circumscribed area is included in the area of the drawing object to be moved or not, it is judged whether the drawing object is an object to be redrawn or not (step S8). If the determined new circumscribed area is included in the drawing object area to be moved, it is judged to be an object to be redrawn (step S8: YES), and otherwise, it is judged to be an object not to be redrawn (step S8: NO).

Then, only the necessary object is redrawn (step S9). At this time, it is drawn by shifting the origin of the present client area by the portion of the offset amount stored in the drawing object table.

Such processing is executed on all drawing objects (step S10). As a result, the drawing objects can be displayed in synchronism with the screen change due to scroll of the general application program.

Explained next is the method for realizing the synchronism of drawing object to screen change due to insertion of sentence. In this case, all drawing objects are not moved in synchronism as in the case of the above scroll, but only the drawing objects beneath the sentence inserted position must be moved. For the sake of simplicity, herein, the initial state right after start-up of application is assumed.

Figure 9B:
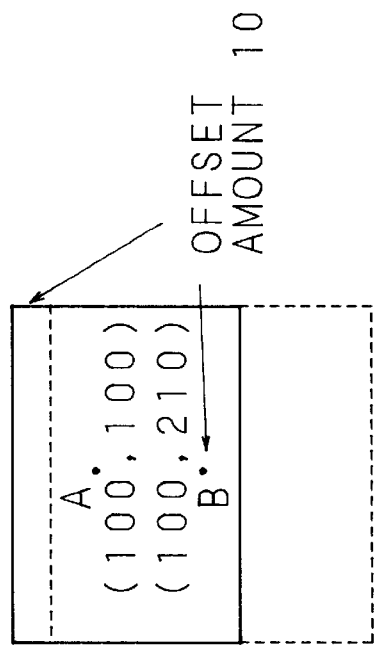
FIGS. 9A, 9B are schematic diagrams for explaining an offset amount in the invention.
Figure 9A:
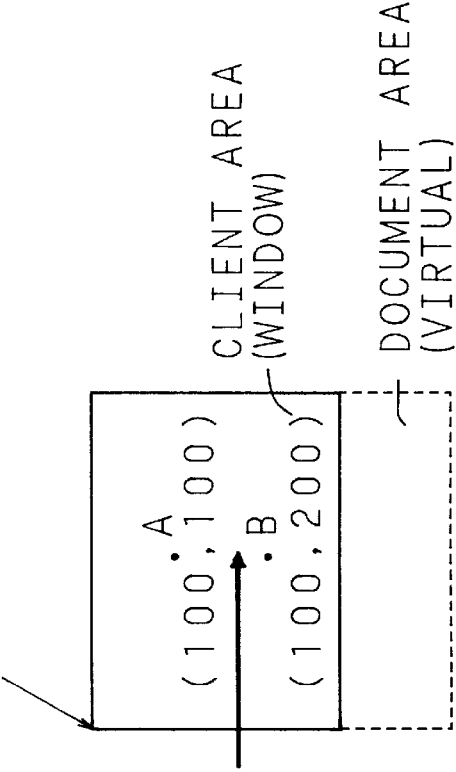

There are two drawing objects A, B as shown in FIG. 9A, and let's suppose line feed (thick arrow in FIG. 9A) is effected between two drawing objects A and B. When line feed is inserted in such position, the position of the upper drawing object A may be as it is, but the lower drawing object B must be moved downward by one line (FIG. 9B). When a sentence is inserted in a certain portion, the drawing command can be hooked, and it is possible to judge from that parameter to scroll down from which portion. Accordingly, a scroll amount (or a drawing moving amount) may be added to the offset amount of only the drawing object existing at the lower side in the document coordinates from the line feed inserted position. For example, in the example shown in FIGS. 9A and 9B, the data of the drawing object A is unchanged at (0, 100, 100), while the data of the drawing object B is changed from (0, 100, 200) to (10, 100, 200). By thus updating the offset amount and shifting the origin of the client coordinates by the offset amount, only part of drawing objects can be moved.

In the case of partial move, specially, the processing is done as follows. The application executing unit 3 recognizes occurrence of sentence input from the notified parameter, and judges the occurrence position of sentence input in the present client area (step S6: NO). Afterwards, using the offset amount from the initial state, the moving area of the drawing object by sentence input is determined, and the moving amount is determined from the notified parameter (step S11). In this case, the moving area is beneath the coordinates of occurrence of sentence input in the document coordinates.

It is next judged whether or not the drawing object to be moved (step S12). The drawing object at the position lower than the occurrence position of sentence input is to be moved, and the drawing object at higher position does not need to move. In the case of the drawing object to be moved, the moving amount is added to the offset amount of the drawing object, and the drawing object table is updated (step S13).

Consequently, from the circumscribed area of the drawing object and the offset amount of its drawing object which are stored in the drawing object table of the drawing information control unit 2, a new circumscribed area of the drawing object is determined in the document coordinates. Depending on the result of judgement whether this circumscribed area is included in the drawing object area to be moved or not, it is judged whether the object is an object to be redrawn or not (step S14). If the new circumscribed area is included in the drawing object area to be moved, it is judged to be an object to be redrawn (step S14: YES), and otherwise it is judged to be an object not requiring to be redrawn (step S14: NO).

The necessary objects are redrawn (step S15). At this time, it is drawn by shifting the origin of the present client area by the portion of the offset amount stored in the drawing object table.

Such process is executed on all drawing objects (step S16). As a result, the drawing object can be displayed in synchronism with the screen change accompanying word input of the general application program.

When the end button of the operation panel is pressed, the contents of the drawing object table of the drawing information control unit 2 are saved in the file, and the moving amount acquiring unit 1 is stopped to terminate hooking of the drawing command.

In the foregoing examples, the screen of the general application program is shifted by the number of input lines along with editing operation by sentence input, but it is similarly processed, of courses, when a certain portion in the document is deleted by one line or plural lines in editing operation, and the screen of the general application program is shifted by the portion of the deleted lines. In this case, the drawing object after the deletion position is the object to be moved, and the offset amount is decreased by the portion corresponding to the number of lines deleted.

The foregoing examples relate to synchronism of drawing object by hook of drawing command, but synchronization of screen is possible by the same method even in the case of hook of screen scroll command.

Thus, in the invention, the position of the handwritten drawing information in the general application program changes in synchronism with the screen change by editing operation such as screen scroll or character input of the general application program, and therefore the drawing information can be reproduced at correct position even after document editing of general application program or after scroll.

As the invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A scroll synchronizing system for moving a drawing object, drawn on an application program, and for editing at least one sentence in synchronization with a screen move of the application program, comprising:

a moving amount acquiring device acquiring information in memory about a screen to be updated by hooking a command to be issued from the application program to an operation system so that the screen of the application program may be updated before the command reaches the operation system in order to examine which drawing object is to be moved and acquire its moving amount, when the screen of the application program is updated by an editing operation of the at least one sentence or by a screen scroll;

a drawing information control device controlling information about the drawing object;

a judging device judging the drawing object to be moved according to the information acquired by said moving amount acquiring device;

an updating device updating the information about the drawing object to be moved in said drawing information control device; and a redrawing device redrawing only the drawing object to be updated based on an offset field of the drawing object having been updated by a portion of a moving amount calculated by said moving amount acquiring device using acquired information.

2. A scroll synchronizing system for moving a drawing object, drawn on an application program, and for editing at least one sentence in synchronization with a screen move of the application program, comprising:

a moving amount acquiring device acquiring information in memory about a screen drawing area to be updated by hooking a command to be issued from the application program to an operation system so that the screen of the application program may be updated before the command reaches the operation system in order to examine which drawing object is to be moved and acquire its moving amount, when the screen of the application program is updated by an editing operation of the at least one sentence or by a screen scroll;

a drawing information control device controlling the information of an amount offset from the initial position of the drawing object to the present position;

a judging device judging the drawing object to be moved according to the information acquired by said moving amount acquiring device;

an updating device updating the information about the drawing object to be moved including the amount offset in said drawing information control device; and a redrawing device redrawing only the drawing object to be updated based on an offset field of the drawing object having been updated by a portion of a moving amount calculated by the moving amount acquiring device using acquired information.

3. A scroll synchronizing system for moving a drawing object, drawn on an application program, and for editing at least one sentence in synchronization with a screen move of the application program, comprising:

a moving amount acquiring device acquiring information about a screen scroll area and a scroll amount from an inputted screen scroll command the screen scroll area to be updated by hooking a command to be issued from the application program to an operation system so that the screen of the application program may be updated before the command reaches the operation system in order to examine which drawing object is to be moved and acquire its moving amount, when the screen of the application program is updated by an editing operation of the at least one sentence or by a screen scroll;

a drawing information control device controlling the information of an amount offset from the initial position of the drawing object to the present position;

a judging device judging the drawing object to be moved according to the information acquired by said moving amount acquiring device;

an updating device updating the information of the drawing object to be moved including the amount offset in said drawing information control device; and a redrawing device redrawing only the drawing object to be updated based on an offset field of the drawing object having been updated by a portion of a moving amount calculated by the moving amount acquiring device using acquired information.

4. A computer memory product storing a computer program for moving a drawing object, drawn on an application program, and for editing at least one sentence in synchronization with a screen move of the application program, said computer program comprising the steps of:

acquiring information about a screen area to be updated by hooking a command to be issued from the application program to an operation system so that the screen of the application program may be updated before the command reaches the operation system in order to examine which drawing object is to be moved and acquire its moving amount, when the screen of the application program is updated by an editing operation of the at least one sentence or by a screen scroll;

controlling information about the drawing object;

judging the drawing object to be moved according to the acquired information;

updating the information about the drawing object to be updated; and redrawing only the drawing object to be updated based on an offset field of the drawing object having been updated by a portion of a moving amount calculated by a moving amount acquiring device using acquired information.

5. A computer memory product storing a computer program for moving a drawing object, drawn on an application program, and for editing at least one sentence in synchronization with a screen move of the application program, said computer program comprising the steps of:

inputting a drawing command when the screen of the application program is updated by an editing operation of the at least one sentence or by a screen scroll;

hooking the drawing command before the command is issued;

acquiring information about a screen drawing area to be updated by hooking a command to be issued from the application program to an operation system so that the screen of the application program may be updated before the command reaches the operation in order to examine which drawing object is to be moved and acquire its moving amount;

controlling the information about an amount offset amount from the initial position of the drawing object to the present position;

judging the drawing object to be moved according to the acquired information;

updating the information about the amount offset of the drawing object to be updated; and redrawing only the drawing object to be updated based on an offset field of the drawing object having been updated by a portion of a moving amount calculated by a moving amount acquiring device using acquired information.

6. A computer memory product storing a computer program for moving a drawing object, drawn on an application program, and for editing at least one sentence synchronization with a screen move of the application program, said computer program comprising the steps of:

inputting a screen scroll command when the screen of the application program is updated by an editing operation of the at least one sentence or by a screen scroll;

hooking the screen scroll command before the command is issued;

acquiring information about a screen area and a scroll amount, the screen scroll area to be updated by hooking a command to be issued from the application program to an operation system so that the screen of the application program may be updated before the command reaches the operation system in order to examine which drawing object is to be moved and acquire its moving amount;

controlling the information about an amount offset amount from the initial position of the drawing object to the present position;

judging the drawing object to be moved according to the acquired information;

updating the information about the amount offset of the drawing object to be updated; and redrawing only the drawing object to be updated based on an offset field of the drawing object having been updated by a portion of a moving amount calculated by a moving amount acquiring device using acquired information.

7. A computer memory product having computer readable program code means for reading by a computer and for moving a drawing object, drawn on an application program, and for editing at least one sentence in synchronization with a screen move of the application program, said computer readable program code means comprising:

program code causing the computer to acquire information about a screen area to be updated by hooking a command to be issued from the application program to an operation system so that the screen of the application program may be updated before the command reaches the operation in order to examine which drawing object is to be moved and acquire its moving amount, when the screen of the application program is updated by an editing operation of the at least one sentence or by a screen scroll;

program code causing the computer to control information about the drawing object;

program code causing the computer to judge the drawing object to be moved according to the acquired information;

program code causing the computer to update the information about the drawing object to be updated; and program code causing the computer to redraw only the drawing object to be updated based on an offset field of the drawing object having been updated by a portion of a moving amount calculated by a moving amount acquiring device using acquired information.

8. A computer memory product having computer readable program code for reading by a computer and for moving a drawing object drawn on an application program, and for editing at least one sentence in synchronization with a screen move of the application program, said computer readable program code means comprising:

program code causing the computer to input a drawing command when the screen of the application program is updated by an editing operation of at least one sentence or by a screen scroll;

program code causing the computer to acquire information about a screen drawing area to be updated by hooking a command to be issued from the application program to an operation system so that the screen of the application program may be updated before the command reaches the operation in order to examine which drawing object is to be moved and acquire its moving amount;

program code causing the computer to control the information about an amount offset from the initial position of the drawing object to the present position;

program code causing the computer to judge the drawing object to be updated according to the acquired information;

program code causing the computer to update the information about the amount offset of the drawing object to be updated; and program code causing the computer to redraw only the drawing object to be updated based on an offset field of the drawing object having been updated by a portion of a moving amount calculated by a moving amount acquiring device using acquired information.

9. A computer memory product having computer readable program code for reading by a computer and for moving a drawing object, drawn on an application program, and for editing at least one sentence in synchronization with a screen move of the application program, said computer readable program code means comprising:

program code causing the computer to input a screen scroll command when the screen of the application program is updated by an editing operation of the at least one sentence or by a screen scroll;

program code causing the computer to acquire information about a screen scroll area and a scroll amount from the inputted screen scroll command to be updated by hooking a command to be issued from the application program to an operation system so that the screen of the application program may be updated before the command reaches the operation in order to examine which drawing object is to be moved and acquire its moving amount;

program code causing the computer to control the information about an amount offset from the initial position of the drawing object to the present position;

program code causing the computer to judge the drawing object to be moved according to the acquired information;

program code causing the computer to update the information about the amount offset of the drawing object to be updated; and program code causing the computer to redraw only the drawing object to be updated based on an offset field of the drawing object having been updated by a portion of a moving amount calculated by a moving amount acquiring device using acquired information.

10. A scroll synchronizing method for moving a drawing object, drawn on an application program, and for editing at least one sentence in synchronization with a screen move of the application program, comprising the steps of:

acquiring information in memory about a screen area updated by hooking a command to be issued from the application program to an operation system so that the screen of the application program may be updated before the command reaches the operation system in order to examine which drawing object is to be moved and acquire its moving amount, when the screen of the application program is updated by an editing operation of the at least one sentence or by a screen scroll;

hooking the command before the command is issued;

controlling information about the drawing object;

determining the drawing object to be moved according to the information acquired by the moving amount acquiring step;

updating the information about the drawing object to be updated; and redrawing only the drawing object to be updated based on an offset field of the drawing object having been updated by a portion of a moving amount calculated by a moving amount acquiring device using acquired information.

11. The scroll synchronizing method of claim 10, wherein the command is a drawing command or a screen scroll command.

12. A scroll synchronizing method for moving a drawing object and for editing at least one sentence in synchronization with a screen move, comprising the steps of:

acquiring information in memory about a system to be updated by hooking a command to be issued from the application program to an operation system so that the screen of the application program may be updated before the command reaches the operation system in order to examine which drawing object is to be moved and acquire its moving amount, when the screen of an application program is updated by an editing operation; and hooking the command before the command is issued, enabling only the drawing object to be moved in relation to the application program based on an offset field of the drawing object having been updated by a portion of a moving amount using acquired information.

* * * * *

UNITED STATES PATENT AND TRADEMARK OFFICE
CERTIFICATE OF CORRECTION

PATENT NO. : 6,072,487
DATED : June 6, 2000
INVENTOR(S) : Jun Kakuta et al.

It is certified that error appears in the above-identified patent and that said Letters Patent is hereby corrected as shown below:

Column 7,
Line 65, after "screen" insert -- drawing area --.

Column 8,
Line 7, after "controlling" insert -- the --.

Signed and Sealed this

Thirtieth Day of July, 2002

*Attest:*

*Attesting Officer*

JAMES E. ROGAN
*Director of the United States Patent and Trademark Office*